United States Patent
Guo et al.

(10) Patent No.: US 7,265,185 B2
(45) Date of Patent: Sep. 4, 2007

(54) PROCESS FOR HYDROGENATING CARBOXYLATED NITRILE RUBBER, THE HYDROGENATED RUBBER AND ITS USES

(75) Inventors: Sharon X. Guo, Stratford (CA); Harald Bender, Pulheim (DE)

(73) Assignee: Lanxess Inc., Sarnia, Ontario (CA)

( * ) Notice: Subject to any disclaimer, the term of this patent is extended or adjusted under 35 U.S.C. 154(b) by 0 days.

(21) Appl. No.: 10/258,245

(22) PCT Filed: Apr. 9, 2001

(86) PCT No.: PCT/CA01/00485

§ 371 (c)(1),
(2), (4) Date: Mar. 19, 2003

(87) PCT Pub. No.: WO01/77185

PCT Pub. Date: Oct. 18, 2001

(65) Prior Publication Data

US 2003/0171500 A1    Sep. 11, 2003

(30) Foreign Application Priority Data

Apr. 10, 2000    (CA) .................................. 2304501

(51) Int. Cl.
*C08C 19/02*    (2006.01)
(52) U.S. Cl. .................... 525/338; 525/339; 525/329.3
(58) Field of Classification Search ............. 525/329.3, 525/338, 339
See application file for complete search history.

(56) References Cited

U.S. PATENT DOCUMENTS

| | | | |
|---|---|---|---|
| 4,631,315 A | 12/1986 | Buding et al. | 525/338 |
| 5,157,083 A | 10/1992 | Aonuma et al. | 525/285 |
| 5,561,197 A | 10/1996 | Rempel et al. | 525/338 |
| 6,403,727 B1 * | 6/2002 | Leube et al. | 525/338 |

FOREIGN PATENT DOCUMENTS

| | | | |
|---|---|---|---|
| DE | 25 39 132 | | 3/1977 |
| DE | 36 18 907 | | 12/1987 |
| EP | 0 111 412 | | 6/1984 |
| EP | 0 134 023 | | 3/1985 |
| EP | 0 795 580 | | 9/1997 |
| GB | 1 558 491 | * | 1/1980 |
| WO | 89/07121 | | 8/1989 |

OTHER PUBLICATIONS

Kautschuk und Gummi Kunststoffe, vol. 42, Issue 2, 1989, pp. 107-110 Dieter Brueck, "IR-Spectrometric Determination of the Proportions of Acrylonitrile, Butadiene and Hydrogenated Butadiene in Hydrogenated Acrylonitrile-Butadiene Rubbers" (part 1).

Kautschuk und Gummi Kunststoffe, vol. 42, Issue 3, 1989, pp. 194-197 Dieter Brueck, IR-Spectrometric Determination of the Proportions of Acrylonitrile, Butadiene and Hydrogenated Butadiene in Hydrogenated Acrylonitrile-Butadiene Rubbers (NHBR) (part 2).

* cited by examiner

*Primary Examiner*—Helen L Pezzuto
(74) *Attorney, Agent, or Firm*—Jennifer R. Seng

(57) ABSTRACT

Polymers of a conjugated diene, an unsaturated nitrile and an α,β-unsaturated carboxylic acid are selectively hydrogenated to reduce carbon-carbon double bonds, without also reducing carboxyl groups and nitrile groups, using a rhodium-containing compound as catalyst. The hydrogenated polymers are novel and display excellent adhesive properties at both room temperature and high temperature, excellent hot tear strength, and excellent abrasion resistance.

26 Claims, 8 Drawing Sheets

PROCESS FOR HYDROGENATING CARBOXYLATED NITRILE RUBBER, THE HYDROGENATED RUBBER AND ITS USES

FIELD OF THE INVENTION

The present invention relates to novel polymers to processes for preparing them, and to their uses.

BACKGROUND OF THE INVENTION

There are known polymers of conjugated dienes and unsaturated nitrites, i.e. nitrile rubbers. It is also known to hydrogenate these. This improves the heat-aging properties of the polymer. When doing so care is needed to ensure that only hydrogenation of carbon-carbon double bonds occurs. Hydrogenation of the nitrile moieties is to be avoided, as any reduction of the nitrile groups has an undesired and deleterious effect on the properties of the nitrile rubber; in particular it reduces the oil resistance of the nitrile rubber.

It has been proposed to include various additional copolymerisable monomers in nitrile rubbers. Among the copolymerisable monomers mentioned are α,β-unsaturated mono- and dicarboxylic acids. These can be incorporated into the polymer backbone, but difficulty has been encountered when polymers containing carboxyl groups have been hydrogenated. Particularly if the degree of hydrogenation is high, the carboxyl groups have undergone reduction or other side reactions, which has resulted in an unsatisfactory product.

To avoid the problem of hydrogenation of the carboxyl groups it has been proposed to prepare a nitrile rubber composed of a conjugated diene and an unsaturated nitrile, to partially hydrogenate this nitrile rubber and thereafter to add α,β-unsaturated acid; see U.S. Pat. No. 5,157,083. This approach has not proven satisfactory. As the acid is added after the formation of the nitrile rubber the acid moieties are not distributed randomly nor alternately along the backbone of the polymer. Terpolymerisation of a conjugated diene, unsaturated nitrile and unsaturated acid results in a polymer in which the α and β carbon atoms of the acid form part of the main carbon backbone of the polymer. In contrast, polymerisation of conjugated diene and nitrile results in a polymer that has some carbon-carbon double bonds in a vinyl side chain, from 1,2-polymerisation of butadiene, and some carbon-carbon double bonds in the main polymer backbone, from 1,4-polymerisation of butadiene. These double bonds in the main polymer backbone may be in the cis or in the trans configuration. When the polymer undergoes hydrogenation the vinyl groups undergo hydrogenation first, followed by the double bonds in the cis configuration. Hence, the partially hydrogenated polymer to which the α,β-unsaturated acid is added contains mostly or entirely double bonds in the main polymer backbone and in the trans configuration. Reaction with the unsaturated acid results in a product in which the α and β carbon atoms of the acid are not in the main carbon backbone of the polymer. Hence, the chemical structure of a polymer made in this latter way differs from the chemical structure of the statistical polymers that is formed by the terpolymerisation of a conjugated diene, an unsaturated nitrile and an unsaturated acid, where the monomers are statistically or randomly distributed throughout the polymer chain.

European Patent Application No. 933381 is concerned with carboxylated nitrile-group-containing highly saturated copolymer rubber, and in the Background Art discusses three processes for adding maleic anhydride to a nitrile-group-containing highly saturated copolymer rubber. The European application refers to "a highly saturated copolymer rubber", but it is believed that some degree of unsaturation in the rubber is required, to serve as reaction sites for addition of the maleic anhydride. Disadvantages of all three processes for adding maleic anhydride are mentioned, and it is said that no satisfactory industrial process has been found. Furthermore, the product of the addition, i.e., the maleic anhydride-nitrile-group-containing polymer is said to be unsatisfactory in various properties, including "abrasion resistance and tensile strength which are required for belts and hoses."

Preparing a carboxylated, hydrogenated nitrile rubber by first preparing a nitrile rubber, then hydrogenating and thereafter adding an unsaturated acid results in an expensive production process. Furthermore, it is difficult to control the amount of acid that adds to the polymer so the quality of the product is uncertain. A product made in this way was introduced commercially but has since been withdrawn from the market.

SUMMARY OF THE INVENTION

A process has now been discovered that permits the selective hydrogenation of a polymer whose backbone is composed of a conjugated diene, an unsaturated nitrile and an unsaturated carboxylic acid, and does not result in any detectable hydrogenation of nitrile or carboxyl moieties. This permits the preparation of a novel polymeric material that is a hydrogenated polymer of a conjugated diene, an unsaturated nitrile and an unsaturated acid. It has also been found that this novel polymeric material has unexpected and valuable properties.

Accordingly, in one aspect, the present invention provides a polymer of a conjugated diene, an unsaturated nitrile and an unsaturated carboxylic acid that has been selectively hydrogenated to reduce carbon-carbon double bonds without hydrogenating nitrile groups and carboxyl groups.

In another aspect, the present invention provides a process for selectively hydrogenating a polymer of a conjugated diene, an unsaturated nitrile and an unsaturated carboxylic acid which comprises subjecting the polymer to hydrogenation in the presence of a rhodium-containing compound as catalyst and a co-catalyst ligand, wherein the weight ratio of the rhodium-containing compound to the co-catalyst ligand is from 1:3 to 1:55.

DESCRIPTION OF PREFERRED EMBODIMENTS

Figure 1:
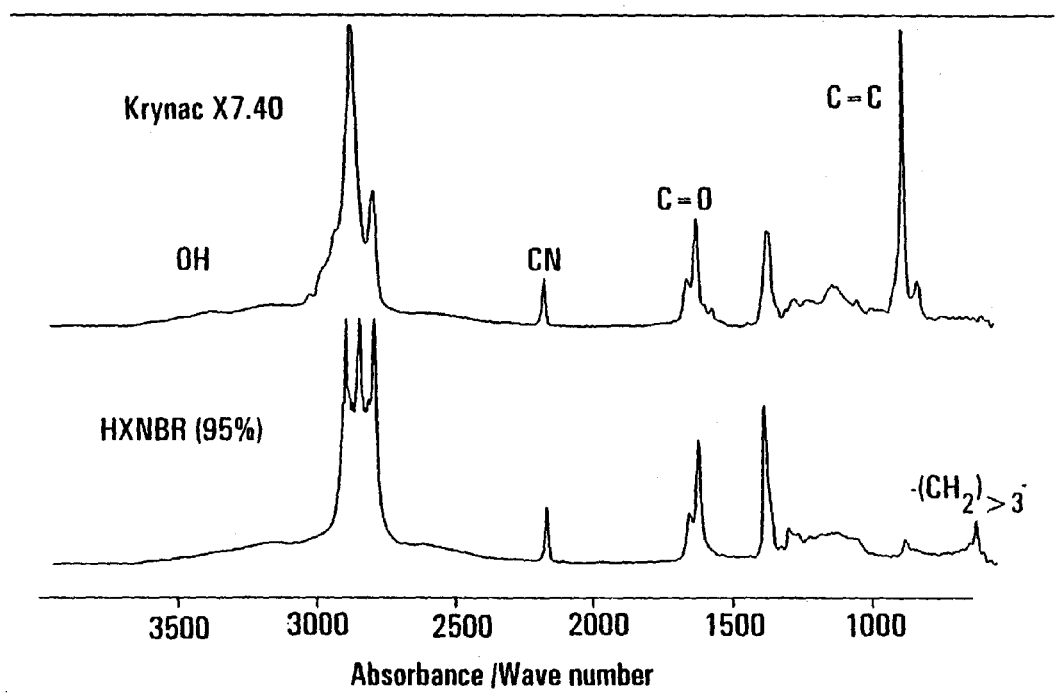
FIG. 1 shows a graph, which shows the infrared spectrum of the polymer prior to and subsequent to hydrogenation.

Many conjugated dienes are used in nitrile rubbers and these may all be used in the present invention. Mention is made of 1,3-butadiene, isoprene, 2,3-dimethyl-1,3-butadiene, 1,3-pentadiene and piperylene, of which 1,3-butadiene is preferred.

The nitrile is normally acrylonitrile or methacrylonitrile or α-chloroacrylonitrile, of which acrylonitrile is preferred.

The α,β-unsaturated acid can be, for example, acrylic, methacrylic, ethacrylic, crotonic, maleic (possibly in the form of its anhydride), fumaric or itaconic acid, of which acrylic and methacrylic are preferred.

The conjugated diene usually constitutes about 50 to about 85% of the polymer, the nitrile usually constitutes about 15 to 50% of the polymer and the acid about 0.1 to about 10%, preferably 0.5 to 7%, these percentages being by weight. The polymer may also contain an amount, usually not exceeding about 10%, of another copolymerisable monomer, for example, an ester of an unsaturated acid, say ethyl, propyl or butyl acrylate or methacrylate, or a vinyl compound, for example, styrene, α-methylstyrene or a corresponding compound bearing an alkyl substitutent on the phenyl ring, for instance, a p-alkylstyrene such as p-methylstyrene. The polymer preferably is a solid that has a molecular weight in excess of about 60,000, most preferably in excess of about 100,000.

The polymer that is to be hydrogenated can be made in known manner, by emulsion or solution polymerisation, resulting in a statistical polymer. The polymer will have a backbone composed entirely of carbon atoms. It will have some vinyl side-chains, caused by 1,2-addition of the conjugated diene during the polymerisation. It will also have double bonds in the backbone from 1,4-addition of the diene. Some of these double bonds will be in the cis and some in the trans orientation. These carbon-carbon double bonds are selectively hydrogenated by the process of the invention, without concomitant hydrogenation of the nitrile and carboxyl groups present in the polymer.

The selective hydrogenation can be achieved by means of a rhodium-containing catalyst. The preferred catalyst is of the formula:

$$(R_mB)_lRhX_n$$

in which each R is a $C_1$-$C_8$-alkyl group, a $C_4$-$C_8$-cycloalkyl group a $C_6$-$C_{15}$-aryl group or a $C_7$-$C_{15}$-aralkyl group, B is phosphorus, arsenic, sulfur, or a sulphoxide group S=O, X is hydrogen or an anion, preferably a halide and more preferably a chloride or bromide ion, l is 2, 3 or 4, m is 2 or 3 and n is 1, 2 or 3, preferably 1 or 3. Preferred catalysts are tris-(triphenylphosphine)-rhodium(I)-chloride, tris-(triphenylphosphine)-rhodium(III)-chloride and tris-(dimethylsulphoxide)-rhodium(III)-chloride, and tetrakis-(triphenylphosphine)-rhodium hydride of formula $((C_6H_5)_3P)_4RhH$, and the corresponding compounds in which triphenylphosphine moieties are replaced by tricyclohexylphosphine moieties. The catalyst can be used in small quantities. An amount in the range of 0.01 to 1.0% preferably 0.03% to 0.5%, most preferably 0.06% to 0.12% especially about 0.08%, by weight based on the weight of polymer is suitable.

The catalyst is used with a co-catalyst that is a ligand of formula $R_mB$, where R, m and B are as defined above, and m is preferably 3. Preferably B is phosphorus, and the R groups can be the same or different. Thus there can be used a triaryl, trialkyl, tricycloalkyl, diaryl monoalkyl, dialkyl monoaryl diaryl monocycloalkyl, dialkyl monocycloalkyl, dicycloalkyl monoaryl or dicycloalkyl monoaryl co-catalysts. Examples of co-catalyst ligands are given in U.S. Pat. No. 4,631,315, the disclosure of which is incorporated by reference. The preferred co-catalyst ligand is triphenylphosphine. The co-catalyst ligand is preferably used in an amount in the range 0.3 to 5%, more preferably 0.5 to 4% by weight, based on the weight of the terpolymer. Preferably also the weight ratio of the rhodium-containing catalyst compound to co-catalyst is in the range 1:3 to 1:55, more preferably in the range 1:5 to 1:45. The weight of the co-catalyst, based on the weight of one hundred parts of rubber, is suitably in the range 0.1 to 33, more suitably 0.5 to 20 and preferably 1 to 5, most preferably greater than 2 to less than 5.

A co-catalyst ligand is beneficial for the selective hydrogenation reaction. There should be used no more than is necessary to obtain this benefit, however, as the ligand will be present in the hydrogenated product. For instance triphenylphosphine is difficult to separate from the hydrogenated product, and if it is present in any significant quantity may create some difficulties in processing of the product.

The hydrogenation reaction can be carried out in solution. The solvent must be one that will dissolve carboxylated nitrile rubber. This limitation excludes use of unsubstituted aliphatic hydrocarbons. Suitable organic solvents are aromatic compounds including halogenated aryl compounds of 6 to 12 carbon atoms. The preferred halogen is chlorine and the preferred solvent is a chlorobenzene, especially monochlorobenzene. Other solvents that can be used include toluene, halogenated aliphatic compounds, especially chlorinated aliphatic compounds, ketones such as methyl ethyl ketone and methyl isobutyl ketone, tetrahydrofuran and dimethylformamide. The concentration of polymer in the solvent is not particularly critical but is suitably in the range from 1 to 30% by weight, preferably from 2.5 to 20% by weight, more preferably 10 to 15% by weight. The concentration of the solution may depend upon the molecular weight of the carboxylated nitrile rubber that is to be hydrogenated. Rubbers of higher molecular weight are more difficult to dissolve, and so are used at lower concentration.

The reaction can be carried out in a wide range of pressures, from 10 to 250 atm and preferably from 50 to 100 atm. The temperature range can also be wide. Temperatures from 60 to 160°, preferably 100 to 160° C., are suitable and from 110 to 140° C. are preferred. Under these conditions, the hydrogenation is usually completed in about 3 to 7 hours. Preferably the reaction is carried out, with agitation, in an autoclave.

Hydrogenation of carbon-carbon double bonds improves various properties of the polymer, particularly resistance to oxidation. It is preferred to hydrogenate at least 80% of the carbon-carbon double bonds present. For some purposes it is desired to eliminate all carbon-carbon double bonds, and hydrogenation is carried out until all, or at least 99%, of the double bonds are eliminated. For some other purposes, however, some residual carbon-carbon double bonds may be required and reaction may be carried out only until, say, 90% or 95% of the bonds are hydrogenated. The degree of hydrogenation can be determined by infrared spectroscopy or $^1$H-NMR analysis of the polymer.

In some circumstances the degree of hydrogenation can be determined by measuring iodine value. This is not a particularly accurate method, and it cannot be used in the presence of triphenyl phosphine, so use of iodine value is not preferred.

It can be determined by routine experiment what conditions and what duration of reaction time result in a particular degree of hydrogenation. It is possible to stop the hydrogenation reaction at any preselected degree of hydrogenation. The degree of hydrogenation can be determined by ASTM D5670-95. See also Dieter Brueck, Kautschuk+Gummi Kunststoffe, Vol 42, No 2/3 (1989), the disclosure of which is incorporated herein by reference. The process of the invention permits a degree of control that is of great advantage as it permits the optimisation of the properties of the hydrogenated polymer for a particular utility.

As stated, the hydrogenation of carbon-carbon double bonds is not accompanied by reduction of carboxyl groups. As demonstrated in the examples below, 95% of the carbon-carbon double bonds of a carboxylated nitrile rubber were reduced with no reduction of carboxyl and nitrile groups detectable by infrared analysis. The possibility exists, however, that reduction of carboxyl and nitrile groups may occur to an insignificant extent, and the invention is considered to extend to encompass any process or production in which insignificant reduction of carboxyl groups has occurred. By insignificant is meant that less than 0.5%, preferably less than 0.1%, of the carboxyl or nitrile groups originally present have undergone reduction.

To extract the polymer from the hydrogenation mixture, the mixture can be worked up by any suitable method. One method is to distil off the solvent. Another method is to inject steam, followed by drying the polymer. Another method is to add alcohol, which causes the polymer to coagulate.

The catalyst can be recovered by means of a resin column that absorbs rhodium, as described in U.S. Pat. No. 4,985,540, the disclosure of which is incorporated herein by reference.

The hydrogenated carboxylated nitrile rubber (HXNBR) of the invention can be crosslinked. Thus, it can be vulcanized using sulphur or sulphur-containing vulcanizing agents, in known manner. Sulphur vulcanization requires that there be some unsaturated carbon-carbon double bonds in the polymer, to serve as reactions sites for addition of sulphur atoms to serve as crosslinks. If the polymer is to be sulphur-vulcanized, therefore, the degree of hydrogenation is controlled to obtain a product having a desired number of residual double bonds. For many purposes a degree of hydrogenation that results in about 3 or 4% residual double bonds (RDB), based on the number of double bonds initially present, is suitable. As stated above, the process of the invention permits close control of the degree of hydrogenation.

The HXNBR can be crosslinked with peroxide crosslinking agents, again in known manner. Peroxide crosslinking does not require the presence of double bonds in the polymer, and results in carbon-containing crosslinks rather than sulphur-containing crosslinks. As peroxide crosslinking agents there are mentioned dicumyl peroxide, di-t-butyl peroxide, benzoyl peroxide, 2,5-dimethyl-2,5-di(t-butylperoxy)-hexyne-3 and 2,5-dimethyl-2,5-di(benzoylperoxy)hexane and the like. They are suitably used in amounts of about 0.2 to 20 parts by weight, preferably 1 to 10 parts by weight, per 100 parts of rubber.

The HXNBR can also be crosslinked via the carboxyl groups, by means of a multivalent ion, especially a metal ion, that is ionically bound to carboxyl groups on two different polymer chains. This may be done, for example, with zinc, magnesium, calcium or aluminum salts. The carboxyl groups can also be crosslinked by means of amines, especially diamines, that react with the carboxyl group. Mention is made of α,ω-alkylenediamines, such as 1,2-ethylene diamine, 1,3-propylene diamine, and 1,4-butylene diamine, and also 1,2-propylene diamine.

The HXNBR of the inventioned can be compounded with any of the usual compounding agents, for example fillers such as carbon black or silica, heat stabilisers, antioxidants, activators such as zinc oxide or zinc peroxide, curing agents co-agents, processing oils and extenders. Such compounds and co-agents are known to persons skilled in the art.

The hydrogenated carboxylated nitrile rubbers of the invention display excellent adhesive properties and, especially, excellent hot tear strength that is much better than that of non-carboxylated nitrile rubber. The rubbers of the invention also display better heat ageing resistance and better low temperature flexibility than non-hydrogenated carboxylated nitrile rubber. They also display excellent abrasion resistance, and good adhesion at both low and high temperature. These properties render them valuable for many specialised applications, but particular mention is made of use as seals in situations where severe stress is encountered, high stiffness automative belts, roll covers, and hoses.

The HXNBR of the invention displays good adhesion to materials, including fabrics, woven and non-woven, metals and plastics, especially plastics with polar groups. The HXNBR will adhere to fabrics of natural fibers, for example wood, cotton, hemp, silk, to synthetic fibers, for example polyamides, polyesters, polyolefins such as polyethylene and polypropylene, poly(meth)acrylonitriles and aramid fibers. It will also adhere well to glass fibers and steel cords. The HXNBR displays particularly good adhesion when the substrate to which it is applied also bears polar groups. A particularly surprising and valuable feature of HXNBR is that the good adhesion is maintained at elevated temperature, whereas hydrogenated nitrile rubber (HNBR) and carboxylated nitrile rubber (XNBR) both display good adhesion at room temperature but less good adhesion at elevated temperature. These properties render the HXNBR particularly valuable in applications, for example belts, where a polymer coating material is affixed as an impregnant and cover of fabric material, especially for any application where the belt may encounter heat.

Hydrogenated nitrile rubber are used in many specialised applications where difficult conditions are encountered. Hydrogenated carboxylated nitrile rubbers of this invention have physical properties that are superior in some respects to those of commercially available hydrogenated nitrile rubbers and hence are useful in many applications where hydrogenated nitrile rubbers are of proven utility. Mention is made of seals, especially in automotive systems and heavy equipment and any other environment in which there may be encountered high or low temperatures, oil and grease. Examples include wheel bearing seals, shock absorber seals, camshaft seals, power steering assembly seals, O-rings, water pump seals, gearbox shaft seals, and air conditioning system seals. Mention is made of oil well specialties such as packers, drill-pipe protectors and rubber stators in downhole applications. Various belts, hoses and mountings provide demanding environments and the properties of HXNBR of this invention render it suitable for applications in air conditioning hoses, camshaft drive belts, oil-cooler hoses, poly-V belts, torsional vibration dampeners, boots and bellows, chain tensioning devices, overflow caps and power steering hoses. The high modulus and high abrasion resistance of HXNBR renders it useful for high-hardness roll applications in, for instance, metal-working rolls, paper industry rolls, printing rolls, elastomer components for looms and textile rolls. The good abrasion resistance and good adhesion to metals of HXNBR renders it suitable for use in bearing pads attached to tracks of tracked vehicles such as bulldozers and other large items of earth moving equipment, military tanks, and the like.

The material to which the polymer of the invention is to adhere may be subjected to treatment to enhance bonding before being contacted with the polymer. For instance, cotton rayon or nylon may be dipped in a mixture that is composed of an aqueous solution of an initial condensate of resorcinal and formaldehyde (referred to as RF) and a rubber latex, this mixture being referred to as RFL. The rubber latex is not particularly limited but may be an acrylonitrile/butadiene copolymer latex, and acrylonitrile/butadiene/methacrylic acid copolymer latex, an acrylonitrile/butadiene/acrylic acid copolymer latex or an acrylonitrile/butadiene/vinylpyridine copolymer latex. The HXNBR rubber of this invention can be used in a latex to serve as the rubber latex for this purpose.

Polyester and aromatic polyamide fibers may be treated with a dip containing an isocyanate, ethylenethiourea or epoxy, heat-treated, and then subjected to treatment with RFL.

As indicated above, the HXNBR rubber can be used in the form of a latex. Formation of a latex can be carried out by milling the HXNBR rubber in the presence of water containing appropriate emulsifiers until the required latex is formed. Suitable emulsifiers for this purpose include amino emulsifiers such as fatty acid soaps, i.e., sodium and potassium salts of fatty acids, rosin acid salts, alkyl and aryl sulfonic acid salts and the like. Oleate salts are mentioned by way of example. The rubber latex may be in solution in an organic solvent, or in admixture with an organic solvent, when added to the water, to form an oil-in-water emulsion. The organic solvent is then removed from the emulsion to yield the required latex. Organic solvents that can be used include the solvents that can be used for the hydrogenation reaction.

Figure 2:
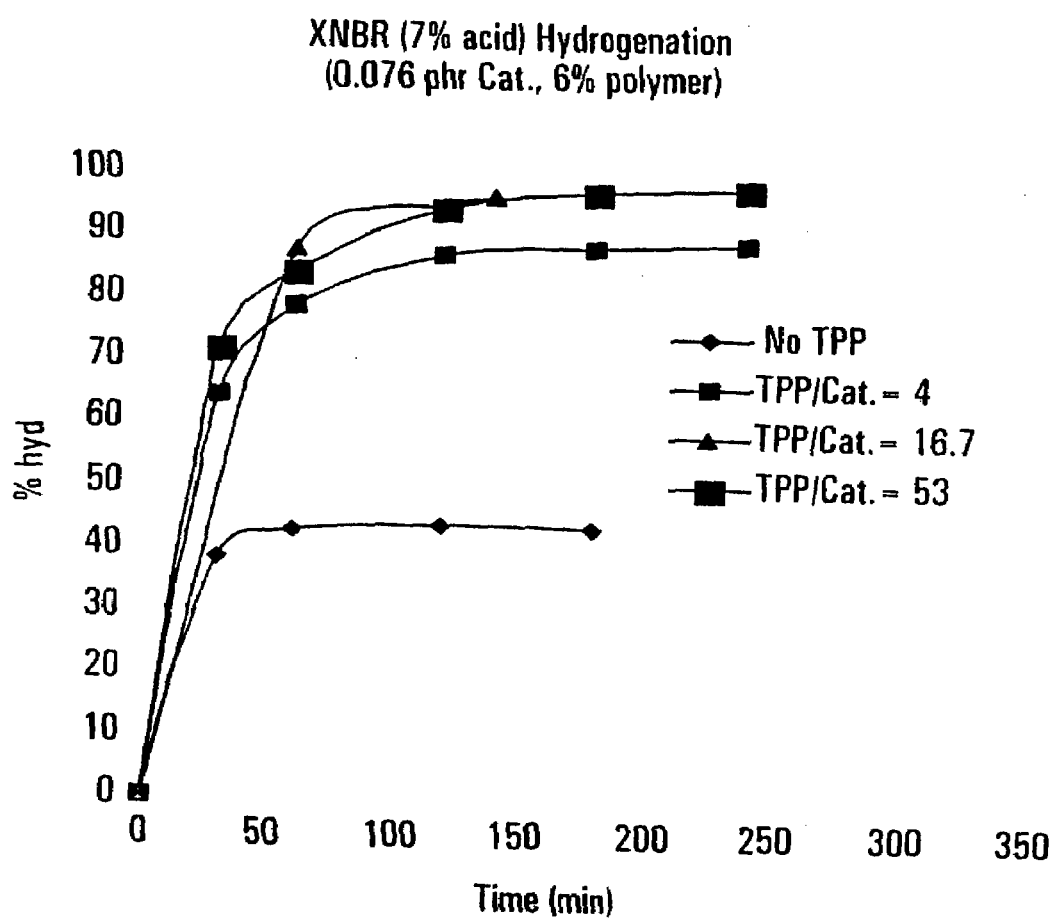
FIG. 2 shows a graph, which shows the degree of hydrogenation achieved with different amounts of ligand co-catalyst.
Figure 3:
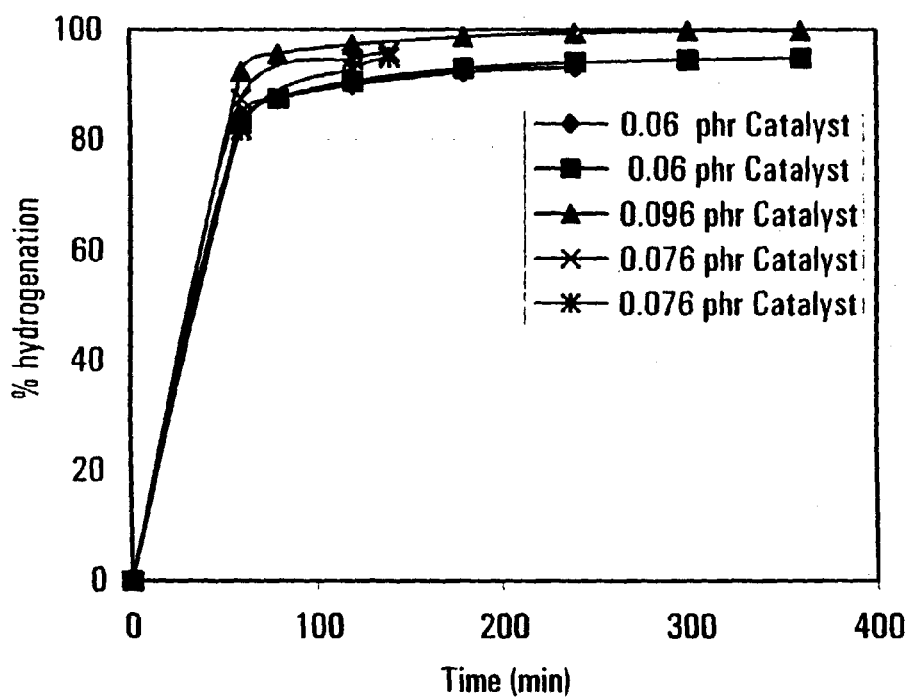
FIG. 3 shows a graph, which shows the degree of hydrogenation of a polymer with time using various different amounts of catalyst loading.
Figure 4:
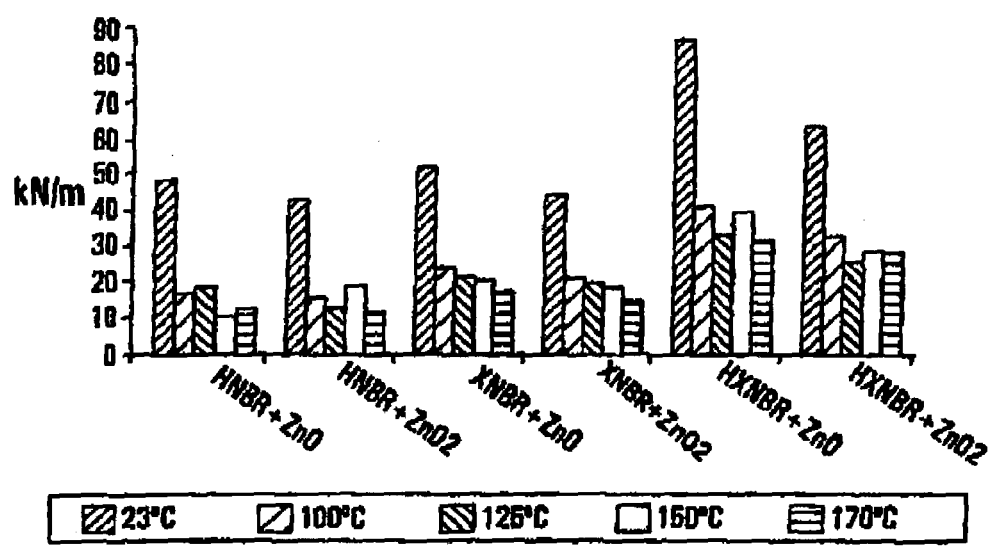
FIG. 4 shows a bar chart, which shows die B tear strength of HNBR, XNBR and HXNBR compounds at different temperatures.
Figure 5:
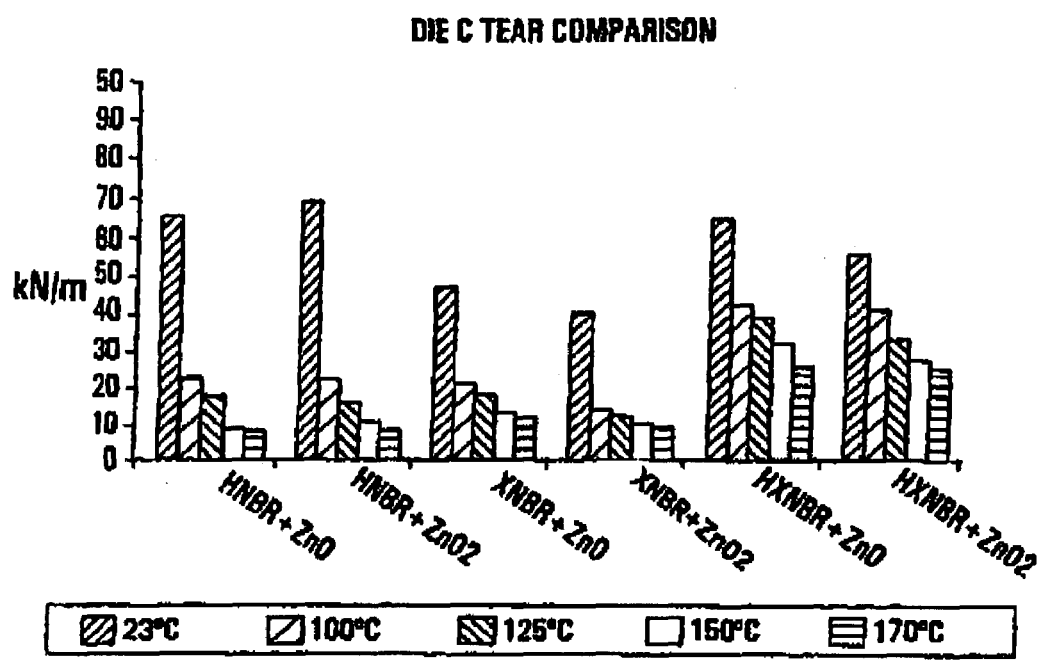
FIG. 5 shows a bar chart, which shows die C tear strength of HNBR, XNBR and HXNBR compounds at different temperatures.
Figure 6:
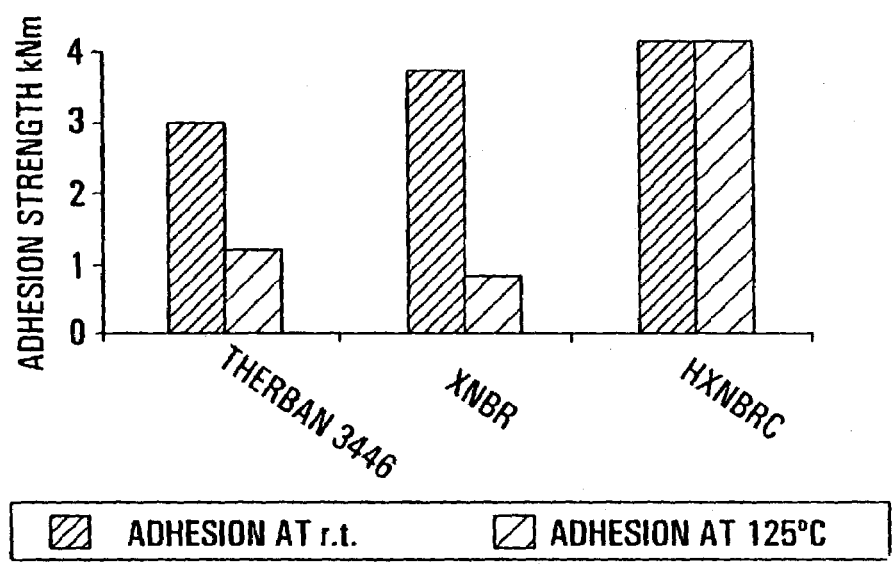
FIG. 6 shows a bar chart, which shows the adhesion to nylon of HNBR, XNBR and HXNBR compounds at room temperature and at 1250° C.
Figure 7:
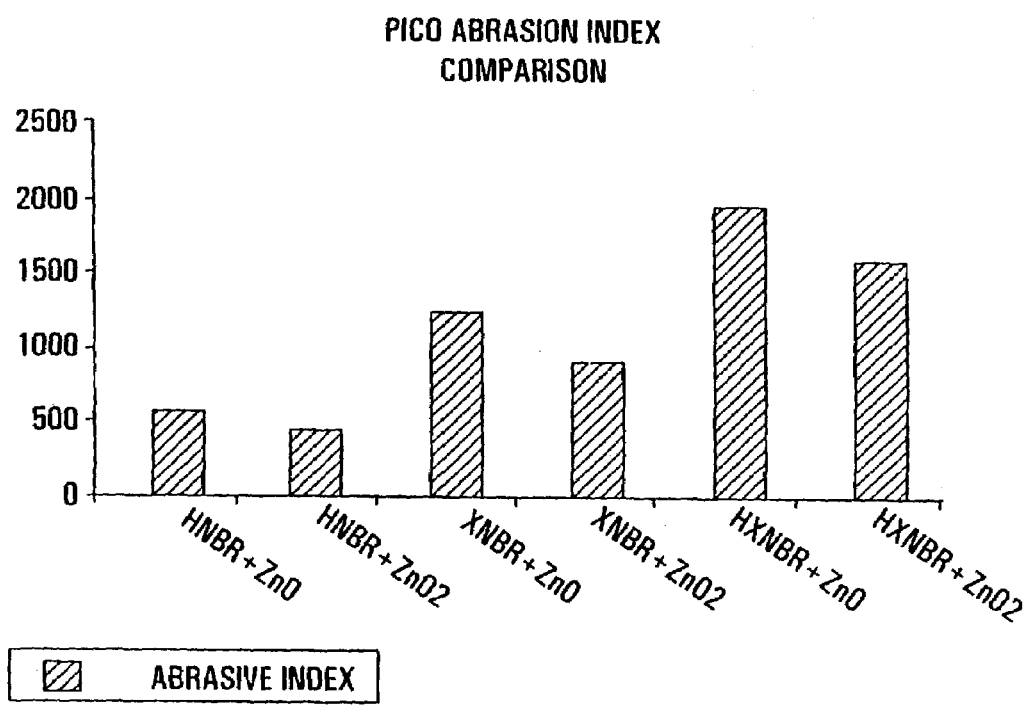
FIG. 7 shows a bar chart, which shows results obtained with HNBR, XNBR and HXNBR in the Pico abrasion test.
Figure 8:
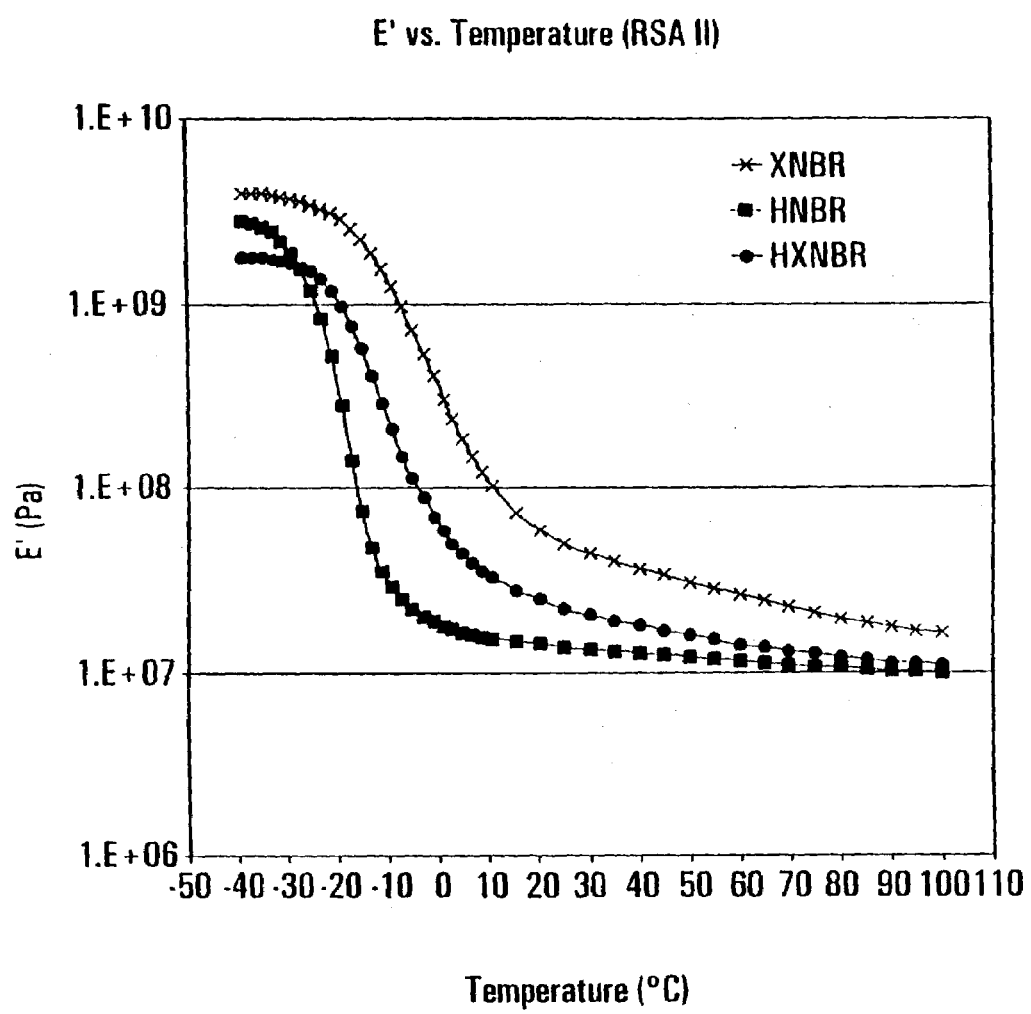
FIG. 8 shows a graph of storage tensile modulus E' versus temperature for HNBR, XNBR and HXNBR.

The invention is further illustrated in the following examples and in the accompanying drawings. Of the drawings:

FIG. 1 is a graph showing the infrared spectrum of the polymer prior to and subsequent to hydrogenation; and FIG. 2 is a graph showing the degree of hydrogenation achieved with different amounts of ligand co-catalyst;

FIG. 3 is a graph showing the degree of hydrogenation of a polymer with time using various different amounts of catalyst loading;

FIG. 4 is a bar chart showing die B tear strength of HNBR, XNBR and HXNBR compounds at different temperatures;

FIG. 5 is a bar chart showing die C tear strength of HNBR, XNBR and HXNBR compounds at different temperatures;

FIG. 6 is a bar chart showing the adhesion to nylon of HNBR, XNBR and HXNBR compounds at room temperature and at 125° C.;

FIG. 7 is a bar chart showing results obtained with HNBR, XNBR and HXNBR in the Pico abrasion test; and FIG. 8 is a graph of storage tensile modulus E' versus temperature for HNBR, XNBR and HXNBR.

SELECTIVE HYDROGENATION OF XNBR

Example 1

In a lab experiment with a 6% polymer load, 184 g of a statistical methacrylic acid-acrylonitrile-butadiene terpolymer containing 28% by weight of acrylonitrile, 7% methacrylic acid, 65% butadiene, ML 1+4/100° C.=40(Krynac X 7.40, commercially available from Bayer), in 2.7 kg of chlorobenzene was introduced into a 2 US gallon Parr high-pressure reactor. The reactor was degassed 3 times with pure $H_2$(100-200 psi) under full agitation. The temperature of the reactor was raised to 130° C. and a solution of 0.139 g (0.076 phr) of tris(triphenylphosphine)-rhodium-(I) chloride catalyst and 2.32 g of co-catalyst triphenylphosphine (TPP) in 60 ml of monochlorobenzene having an oxygen content less than 5 ppm was then charged to the reactor under hydrogen. The temperature was raised to 138° C. and the pressure of the reactor was set at 1200 psi (83 atm). The reaction temperature and hydrogen pressures of the reactor were maintained constant throughout the whole reaction. The degree of hydrogenation was monitored by sampling after a certain reaction time followed by Fourier Transfer Infra Red Spectroscopy (FTIR) analysis of the sample. Reaction was carried out for 140 min at 138° C. under a hydrogen pressure of 83 atmospheres. Thereafter the chlorobenzene was removed by the injection of steam and the polymer was dried in an oven at 80° C. The degree of hydrogenation was 95% (as determined by infrared spectroscopy and $^1$H-NMR). The FTIR result (FIG. 1) showed that the nitrile groups and the carboxylic acid groups of the polymer remained intact after the hydrogenation, indicating the hydrogenation is selective towards the C=C bonds only.

As can be seen, the peak for carbon-carbon double bonds has almost completely disappeared after hydrogenation, consistent with there being 5% of residual double bonds. The peaks for the nitrile groups and for the carbonyl group of the carboxyl group remain, indicating that there has been no detectable reduction of nitrile and carboxyl groups.

The result of hydrogenation, together with results from Example 2, are summarized in Table 1 below.

Example 2

Using Krynac X 7.40 as polymer and a catalyst concentration of 0.076% based on terpolymer weight in the polymer solution, hydrogenation reactions were carried out as in Example 1, in the presence of different quantities of co-catalyst triphenylphosphine (TPP): i.e. 0-4% by weight, based on solid rubber, or co-catalyst/catalyst ratio of 0-53. FIG. 2 and Table 1 below shows the results of the hydrogenation. It is evident that the presence of a co-catalyst assists markedly in hydrogenation of the polymer. Those runs with no co-catalyst are comparative and not in accordance with the process aspect of the invention.

Table 1 Hydrogenation of XNBR (7.0% acid) with Different Ratios of Triphenylphosphine (TPP) to Catalyst.

TABLE 1

| Time (MIN) | % hyd | % RDB | Time (MIN) | % hyd | % RDB |
|---|---|---|---|---|---|
| Cat: 0.076 phr*, 6% polymer, TPP: Cat. = 0:1 | | | Cat: 0.076 phr, 6% Polymer, TPP: Cat. = 4:1 | | |
| 0 | 0 | 100 | 0 | 0 | 100 |
| 30 | 38.2 | 61.8 | 30 | 64.1 | 35.9 |

TABLE 1-continued

| Time (MIN) | % hyd | % RDB | Time (MIN) | % hyd | % RDB |
|---|---|---|---|---|---|
| 60 | 42.6 | 57.4 | 60 | 78.4 | 21.6 |
| 120 | 43.6 | 56.4 | 120 | 86.5 | 13.5 |
| 180 | 43.1 | 56.9 | 180 | 87.9 | 12.1 |
|  |  |  | 240 | 88.6 | 11.4 |
| Cat: 0.076 phr, 6% polymer, TPP: Cat. = 16.7:1 | | | Cat: 0.076 phr, 6% Polymer, TPP: Cat. = 16.7:1 | | |
| 0 | 0 | 100 | 0 | 0 | 100 |
| 60 | 87.4 | 12.6 | 60 | 81.7 | 18.3 |
| 120 | 94.6 | 5.4 | 120 | 92.9 | 7.1 |
| 140 | 95.9 | 4.1 | 140 | 95 | 5 |
| Cat: 0.076 phr, 6% polymer, TPP: Cat. = 53:1 | | | Cat: 0.076 phr, 6% Polymer, TPP/Cat. = 53:1 | | |
| 0 | 0 | 100 | 0 | 0 | 100 |
| 30 | 71.4 | 28.6 | 30 | 68.6 | 31.4 |
| 60 | 83.9 | 16.1 | 60 | 86.2 | 13.8 |
| 120 | 94 | 6 | 120 | 93.8 | 6.2 |
| 180 | 96.7 | 3.3 | 180 | 96.6 | 3.4 |
| 240 | 97.8 | 2.2 | 240 | 97.3 | 2.7 |
|  |  |  | 300 | 98 | 2 |

*parts per 100 parts of rubber

Example 3

Further methacrylic-acrylonitrile-butadiene copolymers (7% acid, 28% ACN, 65% butadiene) were hydrogenated in accordance with the procedure of Example 1, but with different quantities of the catalyst of Example 1. The degrees of hydrogenation achieved were in the range of 93 to 99.5%. The results of these experiments are given in Table 2 and graphically in FIG. 3.

Table 2 Hydrogenation of XNBR (7% Acid)

TABLE 2

| Time (min) | % Hyd | % RDB | Time (min) | % Hyd | % RDB |
|---|---|---|---|---|---|
| 0.06 wt % Rh, 12% polymer, TPP: cat. = 16.7:1 | | | 0.096 wt % Rh, 12% polymer, TPP: cat. = 16.7:1 | | |
| 0 | 0 | 100 | 0 | 0 | 100 |
| 60 | 84.4 | 15.6 | 60 | 92.4 | 7.6 |
| 80 | 87.4 | 12.6 | 80 | 95.5 | 4.5 |
| 120 | 90 | 10 | 120 | 97.2 | 2.8 |
| 180 | 92.3 | 7.7 | 180 | 98.7 | 1.3 |
| 240 | 93.1 | 6.9 | 240 | 99.3 | 0.7 |
|  |  |  | 300 | 99.7 | 0.3 |
| 0.06 wt % Rh, 12% polymer, TPP: cat. = 16.7:1 | | | 0.076 wt % Rh, 12% polymer, TPP: cat. = 16.7:1 | | |
| 0 | 0 | 100 | run 1 | | |
| 60 | 82.9 | 17.1 | 0 | 0 | 100 |
| 80 | 87.5 | 12.5 | 60 | 81.7 | 18.3 |
| 120 | 90.6 | 9.4 | 120 | 92.9 | 7.1 |
| 180 | 93 | 7 | 140 | 95 | 5 |
| 240 | 94 | 6 | run 2 | | |
|  |  |  | 0 | 0 | 100 |
|  |  |  | 60 | 87.4 | 12.6 |
|  |  |  | 120 | 94.6 | 5.4 |
|  |  |  | 140 | 95.9 | 4.1 |

Example 4

Following the procedure of Example 1, terpolymers of methacrylic acid-butadiene-nitrile with 3% acid and 3.5% acid monomer were subjected to hydrogenation. Details and results are given in Table 3. It can be seen that with a 12% solution of polymer 0.076 phr of catalyst and co-catalyst ligand, in a ratio of catalyst to co-catalyst of 1:16.7, 99+% hydrogenation was achieved in less than 2 hours.

Table 3. Hydrogenation Results for XNBR A and B 32% ACN and 3 and 3.5% Acid)

TABLE 3

| Time (min) | % hyd | % RDB | Time (min) | % hyd | % RDB |
|---|---|---|---|---|---|
| A 12% polymer, 0.076 phr cat. | | | A 6% polymer, 0.05 phr cat. | | |
| 0 | 0 | 100 | 0 | 0 | 100 |
| 30 | 83.5 | 16.5 | 34 | 69.9 | 30.1 |
| 60 | 94.4 | 5.6 | 60 | 81.6 | 18.4 |
| 120 | 98.9 | 1.1 | 90 | 88.9 | 11.1 |
| 180 | 99.5 | 0.5 | 120 | 92.4 | 7.6 |
|  |  |  | 135 | 94 | 6 |
|  |  |  | 150 | 95.1 | 4.9 |
| B 12% polymer, 0.076 phr cat. | | | B 6% polymer, 0.05 phr cat. | | |
| 0 | 0 | 100 | 0 | 0 | 100 |
| 30 | 82.7 | 17.3 | 35 | 67.6 | 32.4 |
| 66 | 95.4 | 4.6 | 60 | 82.8 | 17.2 |
| 120 | 99.6 | 0.4 | 90 | 89.9 | 10.1 |
|  |  |  | 120 | 94.2 | 5.8 |
|  |  |  | 140 | 95.1 | 4.9 |

Example 5

Following the procedure of Example 1, hydrogenations of terpolymers of fumaric acid-butadiene-acrylonitrile (<1% acid) were carried out. Without the use of a co-catalyst, 86% hydrogenation was achieved in 4 hours. When a co-catalyst: catalyst ratio of 4:1 was used, 99% hydrogenation was achieved in 3 hours. The results are presented in Table 4.

Table 4. Hydrogenation of Fumaric Acid-Butadiene-Nitrile Terpolymer (0.076 phr Cat., 6% Polymer)

TABLE 4

| | 0 TPP | | | 0.3 phr TPP | |
|---|---|---|---|---|---|
| Time (min) | % hyd | % RDB | Time (min) | % hyd | % RDB |
| 0 | 0.0 | 100.0 | 0 | 0 | 100 |
| 30 | 60.0 | 40.0 | 30 | 72.1 | 27.9 |
| 60 | 71.5 | 28.5 | 60 | 90.9 | 9.1 |
| 120 | 82.0 | 18.0 | 120 | 98.5 | 1.5 |
| 180 | 84.6 | 15.4 | 180 | 99.5 | 0.5 |
| 240 | 86.0 | 14.0 | | | |

Physical Properties of HXNBR

The properties of the HXNBR of the invention were investigated in the following examples. All non-polymer raw materials used in the examples are commercially available. Preparative Examples 1 to 5 above were carried out in the laboratory. The process was then transferred to a pilot plant. The HXNBR that was subjected to testing for physical properties was made in the pilot plant but generally in accordance with the conditions used in the laboratory. In particular, the amount of catalyst used was 0.076 phr, the weight ratio of triphenylphosphine co-catalyst to rhodium-containing catalyst was 16.7:1, the XNBR subjected to hydrogenation was Krynac X 7.40 the solvent was monochlorobenzene and the solution was either 6% or 12% strength.

The HXNBR had a Mooney of 114 (ML 1+4 100° C.). The commercially available XNBR was Krynac X 7.40. Also used for comparison purposes was a hydrogenated nitrile rubber (HNBR) commercially available from Bayer under the trade-mark Therban C 3446, composed of 34% acrylontrile, 66% butadiene, hydrogenated to about 3.5-4.5% RDB. Therban C 3446 has a Mooney of 58 (ML 1+4 100° C.).

Mixing Procedures

The HXNBR, HNBR and XNBR compounds were mixed in a 1.6 liter model BR 82, Farrel Banbury mixer at 53 rpm. For better mixing, an 80% fill factor was used when sizing the batch. The polymer was added first with carbon black filler and mixed for about 1 minute followed by the addition of all other dry fillers, stearic acid, non zinc containing antioxidants and plasticizer. The batch was dumped at a mixing time of 6 minutes and the dump temperatures were recorded. In general the dump temperature for HXNBR based compounds ranged between 140-155° C. For the other two polymer-based compounds, the dump temperature was below 140° C. Standard laboratory mill mixing procedures were used to incorporate the curatives and zinc containing ingredients in a separate mixing step.

Example 6

In this example the compounds were subjected to peroxide curing. The formulations of the HXNBR, HNBR and XNBR compounds are given in Table 5.

TABLE 5

|  | Run | | | | | |
| --- | --- | --- | --- | --- | --- | --- |
|  | A | B | C | D | E | F |
| CARBON BLACK, N660 | 50 | 50 | 50 | 50 | 50 | 50 |
| HXNBR (5% RDB) |  |  |  |  | 100 | 100 |
| KRYNAC X7.40 |  |  | 100 | 100 |  |  |
| THERBAN C 3446 | 100 | 100 |  |  |  |  |
| NAUGARD 445 ANTIOXIDANT | 1 | 1 | 1 | 1 | 1 | 1 |
| PLASTHALL TOTM PLASTICIZER OIL | 5 | 5 | 5 | 5 | 5 | 5 |
| STEARIC ACID ACTIVATOR | 1 | 1 | 1 | 1 | 1 | 1 |
| DIAK #7 CO-AGENT | 1.5 | 1.5 | 1.5 | 1.5 | 1.5 | 1.5 |
| STRUKTOL ZP 1014 ZINC PEROXIDE |  | 7 |  | 7 |  | 7 |
| VULCUP 40KE ORGANIC PEROXIDE | 7.5 | 7.5 | 7.5 | 7.5 | 7.5 | 7.5 |
| VULKANOX ZMB-2/C5 (ZMMBI) ANTIOXIDANT | 0.4 | 0.4 | 0.4 | 0.4 | 0.4 | 0.4 |
| ZINC OXIDE (KADOX 920) ACTIVATOR | 3 |  | 3 |  | 3 |  |
| Total | 169.4 | 173.4 | 169.4 | 173.4 | 169.4 | 173.4 |

The tensile strength, elongation at break, and modulus at different strains for these three compounds were tested at 23, 100, 125, 150 and 170° C. Table 6 presents the tensile strength and elongation at break for HNBR, XNBR, and HXNBR compounds using ZnO activator. It is evident that the HXNBR based compound shows a physical property profile very different from those of XNBR and HNBR.

When the samples were tested at room temperature, both XNBR and HXNBR showed a higher modulus and higher tensile strength than those of HNBR. However, HXNBR based compound had a much better elongation at break than the XNBR based compound. HXNBR based compound also showed the best tensile strength and ultimate elongation at high testing temperature.

Table 6 Summary of Tensile Strength and Elongation at Break Results

TABLE 6

| Compound No. | A (HNBR) | C (XNBR) | E (HXNBR) |
| --- | --- | --- | --- |
| Test Temperature (° C.) | 23 | 23 | 23 |
| Hard. Shore A2 Inst. (pts.) | 67 | 84 | 81 |
| Ultimate Tensile (Mpa) | 23.63 | 25.66 | 29.3 |
| Ultimate Elongation (%) | 223 | 138 | 231 |
| Test Temperature (° C.) | 100 | 100 | 100 |
| Hard. Shore A2 Inst. (pts.) | 65 | 74 | 67 |
| Ultimate Tensile (Mpa) | 8.47 | 15.32 | 17.96 |
| Ultimate Elongation (%) | 109 | 116 | 329 |
| Test Temperature (° C.) | 125 | 125 | 125 |
| Hard. Shore A2 Inst. (pts.) | 65 | 76 | 66 |
| Ultimate Tensile (Mpa) | 6.73 | 11.36 | 15.32 |
| Ultimate Elongation (%) | 95 | 100 | 288 |
| Test Temperature (° C.) | 150 | 150 | 150 |
| Hard. Shore A2 Inst. (pts.) | 65 | 66 | 67 |
| Ultimate Tensile (Mpa) | 6.46 | 10.03 | 13.21 |
| Ultimate Elongation (%) | 87 | 89 | 257 |
| Test Temperature (° C.) | 170 | 170 | 170 |
| Hard. Shore A2 Inst. (pts.) | 67 | 72 | 72 |
| Ultimate Tensile (Mpa) | 4.64 | 7.54 | 10.51 |
| Ultimate Elongation (%) | 71 | 74 | 228 |

Hot Tear Strength

Table 7 and FIGS. 4 and 5 compare the tear strength of HXNBR with that of XNBR and HNBR at different testing temperatures. HXNBR shows excellent tear strength at all temperatures in both die B and die C tear tests. For example, when tested at 100 to 170° C., the die B tear strength of HXNBR remains in the range of 30 to 40 kN/m, while the die B tear for XNBR and HNBR are only in the range of 10-20 kN/m (FIG. 4, and Table 7). In the case of die C tear test, although HXNBR shows the same tear strength as that of HNBR at room temperature, its tear strength is two or three times that of HNBR at higher testing temperatures. The die C tear strength of the HXNBR based compound is also much higher than that of the XNBR based compound in the temperature range 23 to 170° C.

Table 7 Tear strength in kN/m of HXNBR, XNBR and HNBR at Different Temperatures

TABLE 7

|  | HNBR + ZnO | HNBR + ZnO2 | XNBR + ZnO | XNBR + ZnO2 | HXNBR + ZnO | HXNBR + ZnO2 |
| --- | --- | --- | --- | --- | --- | --- |
| Die B |  |  |  |  |  |  |
| 23° C. | 46.95 | 40.69 | 50.73 | 43.74 | 85.45 | 62.18 |
| 100° C. | 16.26 | 15.09 | 23.51 | 21.41 | 39.76 | 31.65 |
| 125° C. | 18.08 | 12.2 | 20.18 | 18.3 | 31.63 | 25.01 |

TABLE 7-continued

|        | HNBR + ZnO | HNBR + ZnO2 | XNBR + ZnO | XNBR + ZnO2 | HXNBR + ZnO | HXNBR + ZnO2 |
|--------|------------|-------------|------------|-------------|-------------|--------------|
| 150° C. | 9.25  | 17.49 | 19.25 | 18.1  | 38.56 | 27.52 |
| 170° C. | 11.02 | 10.54 | 16.43 | 14.44 | 30.61 | 27.34 |
| Die C  |            |             |            |             |             |              |
| 23° C.  | 32.46 | 34.45 | 23.51 | 20.42 | 32.28 | 28.09 |
| 100° C. | 11.25 | 11.03 | 10.77 | 7.23  | 21.74 | 20.37 |
| 125° C. | 8.85  | 7.9   | 9.18  | 6.44  | 19.77 | 16.86 |
| 150° C. | 4.57  | 5.5   | 6.79  | 5.12  | 16.22 | 14.11 |
| 170° C. | 4.23  | 4.56  | 6.69  | 4.62  | 12.97 | 13.04 |

Adhesion of HXNBR to Nylon Fabrics

One special property of HXNBR is improved adhesion to fabrics used in the belt industry. This polymer shows excellent tear strength at high temperature range and a better adhesion at high temperature. The adhesion of HXNBR, XNBR and HNBR compounds to a nylon fabric (a nylon fabric commonly used in automotive timing belts) was tested at both 23 and 125° C. The results of this test for the three compounds that used ZnO as activator are presented in Table 8 and FIG. 6.

It is evident that the adhesions of XNBR and HXNBR at room temperature are better than that of HNBR. However, at 125° C. only HXNBR shows an adhesion that is as good as at room temperature. Both XNBR and HNBR based compounds showed a significant decrease in adhesion strength when the testing temperature changed from 23 to 125° C.

Table 8 Adhesion Test Results at Different Temperatures

TABLE 8

|  | Compound | | |
|--|----------|--|--|
|  | A (HNBR) | C (XNBR) | E (HXNBR) |
| Cure Time (min) | 40 | 40 | 40 |
| Cure Temperature (° C.) | 160 | 160 | 160 |
| Test Temperature (° C.) | 23 | 23 | 23 |
| Adhesion To | nylon | nylon | nylon |
| Adhesive Strength (kNm) | 2.92 | 3.62 | 4.97 |
| Cure Time (min) | 40 | 40 | 40 |
| Cure Temperature (° C.) | 160 | 160 | 160 |
| Test Temperature (° C.) | 125 | 125 | 125 |
| Adhesion To | nylon | nylon | nylon |
| Adhesive Strength (kNm) | 1.15 | 0.74 | 4.91 |

Abrasion Resistance

It is known that the abrasion resistance of nitrile rubber (NBR) is improved by introducing carboxylic acid groups into the polymer. This effect is shown in Pico abrasion test (see FIG. 7). Although both HXNBR and XNBR show better abrasion resistance than the HNBR based compound, HXNBR based compound is far better than XNBR in abrasion resistance. This unique property of HXNBR demonstrates that this polymer has very important potential in applications such as rubber rolls and shaft seals.

The superior abrasion resistance of HXNBR is not observed in the DIN abrasion test as shown in Table 9. This is probably due to its rather different abrasion mechanism from the Pico abrasion test. In this test, both HNBR and HXNBR show better resistance to abrasion than the XNBR based compound.

Table 9 DIN Abrasion Test Results

TABLE 9

|  | A HNBR | B HNBR | C XNBR | D XNBR | E HXNBR | F HXNBR |
|--|--------|--------|--------|--------|---------|---------|
| Cure Time (min) | 25 | 25 | 25 | 25 | 25 | 25 |
| Cure Temperature (° C.) | 170 | 170 | 170 | 170 | 170 | 170 |
| Specific Gravity | 1.16 | 1.165 | 1.2 | 1.21 | 1.165 | 1.165 |
| Abrasion Volume Loss (mm$^3$) | 93 | 104 | 160 | 181 | 92 | 96 |

Cold Temperature Flexibility

The low temperature flexibility of HXNBR based compounds is compared with those of HNBR and XNBR based compound in both Gehman and TR tests. The results of these tests are summarized in Tables 10 and 11. Due to the presence of 7% carboxylic acid groups, the low temperature flexibility of HXNBR polymer is not as good as that of HNBR, as shown in both TR and Gehman testing. The lower temperature properties of the HXNBR compounds are better to these of the XNBR compounds.

Table 10 Gehman Low Temperature Stiffness

TABLE 10

|  | Compound No. | | | | | |
|--|--------------|--|--|--|--|--|
|  | A HNBR | B HNBR | C XNBR | D XNBR | E HXNBR | F HXNBR |
| Cure Time (min) | 20 | 20 | 20 | 20 | 20 | 20 |
| Cure Temperature (° C.) | 170 | 170 | 170 | 170 | 170 | 170 |
| Start Temperature (min) | −70 | −70 | −70 | −70 | −70 | −70 |
| Temperature @ T2 (° C.) | −19 | −19 | −2 | −2 | −3 | −3 |
| Temperature @ T5 (° C.) | −24 | −25 | −11 | −9 | −15 | −15 |

TABLE 10-continued

| | Compound No. | | | | | |
|---|---|---|---|---|---|---|
| | A HNBR | B HNBR | C XNBR | D XNBR | E HXNBR | F HXNBR |
| Temperature @ T10 (° C.) | −26 | −26 | −14 | −13 | −18 | −19 |
| Temperature @ T100 (° C.) | −30 | −31 | −24 | −25 | −28 | −28 |

Table 11 Temperature Retraction Comparison

TABLE 11

| | Compound No. | | | | | |
|---|---|---|---|---|---|---|
| | A HNBR | B HNBR | C XNBR | D XNBR | E HXNBR | F HXNBR |
| Cure Time (min) | 20 | 20 | 20 | 20 | 20 | 20 |
| Cure Temperature (° C.) | 170 | 170 | 170 | 170 | 170 | 170 |
| Initial Elongation (%) | 50% | 50% | 50% | 50% | 50% | 50% |
| TR 10 (° C.) | −22 | −22 | −16 | −14 | −14 | −14 |
| TR 30 (° C.) | −19 | −19 | −9 | −8 | −7 | −8 |
| TR 50 (° C.) | −16 | −16 | −3 | −1 | −2 | −2 |
| TR 70 (° C.) | −13 | −13 | 3 | 5 | 3 | 3 |
| Temp Retraction TR10-TR70 | 9 | 9 | 19 | 19 | 17 | 17 |

Example 7

Three peroxide-cured compounds were produced from HXNBR, a XNBR and a regular HNBR, using the following formulation shown in Table 12:

TABLE 12

| Compound | 4 | 5 | 6 |
|---|---|---|---|
| CARBON BLACK, N 660 | 50 | 50 | 50 |
| HXNBRC (J-11341) | | | 100 |
| KRYNAC X7.40 | | 100 | |
| THERBAN C 3446 | 100 | | |
| NAUGARD 445 | 1 | 1 | 1 |
| PLASTHALL TOTM | 5 | 5 | 5 |
| STEARIC ACID | 1 | 1 | 1 |
| DIAK #7 | 1.5 | 1.5 | 1.5 |
| STRUKTOL ZP 1014 | 7 | 7 | 7 |
| VULCUP 40KE | 7.5 | 7.5 | 7.5 |
| VULKANOX ZMB-2/C5 (ZMMBI) | 0.4 | 0.4 | 0.4 |

The low temperature flexibility of these three compounds was determined by using a Rheometrics Solid analyzer (RSA-II). In this test, a small sinusoidal tensile deformation is imposed on the specimen at a given frequency. The resulting force, as well as the phase difference between the imposed deformation and the response, are measured at various temperatures. Based on theory of linear viscoelasticity, the storage tensile modulus (E'), loss tensile modulus (E") and tan δ can be calculated. In general, as the temperature decreases, rubber becomes more rigid and, the E' will increase. At close to the glass transition temperature, there will be a rapid increase in E'. FIG. 8 presents the E'-temperature plots for these three compounds. The HXNBR showed a higher glass transition temperature than that of HNBR. It has surprisingly been found that the glass transition temperature of HXNBR is lower than that of the XNBR.

The invention claimed is:

1. A process for selectively hydrogenating carbon-carbon double bonds of a polymer of a conjugated diene, an unsaturated nitrile and an unsaturated carboxylic acid, which comprises the steps of dissolving the polymer in a solution which consists of an organic solvent and then subjecting the polymer to hydrogenation in the presence of a rhodium-containing compound as catalyst and a co-catalyst ligand, wherein the weight ratio of the rhodium-containing compound to the co-catalyst ligand is from 1:3 to 1:55, wherein the polymer comprises from about 50 to about 85% conjugated diene, from about 15 to 50% of unsaturated nitrile and from about 0.1 to 10% unsaturated carboxylic acid, and wherein an insignificant amount of nitrile and carboxylic acids groups are reduced during hydrogenation.

2. A process according to claim 1, wherein the rhodium-containing compound is a compound of the formula:

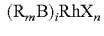

$(R_mB)_lRhX_n$ wherein each R is a $C_1$-$C_6$-alkyl group, a $C_4$-$C_8$cycloalkyl group, a $C_6$-$C_{15}$-aryl group or a $C_7$-$C_{15}$ aralkyl group, B is an atom of phosphorus, arsenic or sulfur, or is a sulfonyl group S=O, X is hydrogen or an anion, I is 2, 3 or 4, m is 2 or 3 and n is 1, 2 or 3.

3. A process according to claim 1, wherein the co-catalyst ligand is of formula:

$R_mD$ where each R is a $C_1$-$C_6$-alkyl group, m is 2 or 3 and B is an atom of phosphorus, arsenic or sulfur, or is a sulfonyl group S=O.

4. A process according to claim 2, wherein B is phosphorus.

5. A process according to claim 1, wherein the rhodium-containing compound is tris-(triphenylphosphine)-rhodium (I)-chloride, tris-(triphenylphosphifle)-rhodium (III)Chloride, tris-(dimethyisulfoxide)-rhodium(III)-Chlorilde, or tetrakis-(triphenylphosphine)-rhodium hydride.

6. A process according to claim 1, wherein the amount of the rhodium-containing compound is in the range 0.03 to 0.5%, based on the weight of the polymer to be hydrogenated.

7. A process according to claim 4, wherein the co-catalyst ligand is triphenylphosphifle.

8. A process according to claim 1, wherein the weight ratio of rhodium-containing compound to co-catalyst ligand is in the range 1:3 to 1:45.

9. A process according to claim 1, wherein the amount of co-catalyst is in the range 0.1 to 33 parts by weight per hundred parts by weight of polymer.

10. A process according to claim 9, wherein the amount of co-catalyst is in the range 0.5 to 20 parts by weight per hundred parts by weight of polymer.

11. A process according to claim 10, wherein the amount of co-catalyst is in the range 1 to less than 5 parts by weight per hundred parts by weight of polymer.

12. A process according to claim 1, wherein the amount of co-catalyst is greater than 2 parts by weight per hundred parts by weight of polymer.

13. A process according to claim 1, wherein the polymer that is subjected to selective hydrogenation has a molecular weight greater than about 60,000 (Mw).

14. A process according to claim 2, wherein the polymer that is subjected to selective hydrogenation has a molecular weight greater than about 100,000 (MW).

15. A process according to claim 1, which is carried out at a temperature in the range of 60 to 160° C. and a pressure in the range 10 to 250 atmospheres.

16. A process according to claim 1, wherein the selective hydrogenation is carded out until at least 80% of the carbon-carbon double bonds have been hydrogenated.

17. A process according to claim 16, wherein the selective hydrogenation is carried out until at least 90% of the carbon-carbon double bonds have been hydrogenated.

18. A process according to claim 17, wherein the selective hydrogenation is carried out until at least 95% of the carbon-carbon double bonds have been hydrogenated.

19. A process according to claim 18, wherein the selective hydrogenation is carded out until at least 99% of the carbon-carbon double bonds have been hydrogenated.

20. A process according to claim 1, wherein the polymer comprises from 85 to 50% by weight of conjugated diene, from 0.1 to 10% by weight of $\alpha,\beta$-unsaturated carboxylic acid and from 15 to 50% by weight of acrylonitrile or methacrylonitrile.

21. A process according to claim 1, wherein the conjugated diene is selected from the group consisting of 1,3-butadiene, isoprene, 2,3-dimethyl-1,3-butadiene, 3-pentadiene and piperylene.

22. A process according to claim 21, wherein the conjugated diene is 1,3-butadiene.

23. A process according to claim 1, wherein the nitrile is selected from the group consisting of acrylonitdle, methacrylonitrile and $\alpha$-chioroacrylonitrile.

24. A process according to claim 23, wherein the nitrile is acrylonitrile.

25. A process according to claim 1, wherein $\alpha,\beta$-unsaturated acid is selected from the group consisting of acrylic acid, methacrylic acid, ethacrylic acid, crotonic acid, maleic acid, fumaric acid and itacoflic acid.

26. A process according to claim 1, wherein the $\alpha,\beta$-unsaturated acid is selected from the group consisting of acrylic acid and methacrylic acid.

* * * * *